(12) United States Patent
Klose

(10) Patent No.: US 8,703,086 B2
(45) Date of Patent: Apr. 22, 2014

(54) METHOD FOR PRODUCING PHOSPHATES AND PHOSPHATE-CONTAINING COMPOUNDS, PARTICULARLY ALKALINE EARTH PHOSPHATES, ALKALINE EARTH SILICOPHOSPHATES, OR ALKALINE EARTH OXIDES

(75) Inventor: Siegfried Klose, Andernach (DE)

(73) Assignees: Ingeborg Klose, Andernach (DE); Frank Zepke, Muenster (DE)

( * ) Notice: Subject to any disclaimer, the term of this patent is extended or adjusted under 35 U.S.C. 154(b) by 0 days.

(21) Appl. No.: 13/493,325

(22) Filed: Jun. 11, 2012

(65) Prior Publication Data

US 2012/0288425 A1 Nov. 15, 2012

Related U.S. Application Data

(63) Continuation of application No. PCT/EP2009/008790, filed on Dec. 9, 2009.

(51) Int. Cl.
*C01B 25/26* (2006.01)
*C01B 17/00* (2006.01)

(52) U.S. Cl.
USPC ............................................. 423/311; 71/19

(58) Field of Classification Search
USPC ................................ 423/157.5, 317, 311, 168
See application file for complete search history.

(56) References Cited

U.S. PATENT DOCUMENTS 5,141,511 A * 8/1992 Bauer ............................ 435/325

FOREIGN PATENT DOCUMENTS

| DE | 100 30 550 A1 | 8/2001 |
| DE | 101 24 073 A1 | 11/2002 |
| DE | 101 40 312 A1 | 2/2003 |
| DE | 102 23 657 A1 | 12/2003 |
| DE | 103 12 603 A1 | 7/2004 |
| JP | 2003-176189 A | 6/2003 |
| WO | WO 2008073186 A2 * | 6/2008 |
| WO | WO 2009/039864 A1 | 4/2009 |
| WO | WO 2009039864 A1 * | 4/2009 |

OTHER PUBLICATIONS

Conesa et al, "Thermal Decomposition of meat and bone meal," 2003, J. Anal. Appl. Pyrolysis, vol. 70, pp. 619-630.*
Ringer et al, "Large-Scale Pyrolysis Oil Production: A Technology Assessment and Economic Analysis," 2006, National Renewable Energy Laboratory, pp. 1-73.*

* cited by examiner

*Primary Examiner* — Steven Bos
*Assistant Examiner* — Justin Bova
(74) *Attorney, Agent, or Firm* — Muncy, Geissler, Olds & Lowe, P.C.

(57) ABSTRACT

A method for producing phosphates and/or compounds containing phosphates is provided, in particular alkaline-earth phosphates, alkaline-earth silicophosphates, and alkaline-earth oxides, comprising the following steps: (a) heating bones and/or fish bones or a composition of said components in a pyrolysis process in the absence of oxygen and under reductive conditions at temperatures between 500 and 1100° C., wherein among other things high-energy gases, vapors, and carbon are produced, (b) subsequently combusting the carbon produced in step (a) under oxidative conditions in an oxidation step, wherein an inorganic radical of alkaline-earth carbonates, alkaline-earth oxides, and alkaline-earth phosphates is produced.

4 Claims, 1 Drawing Sheet

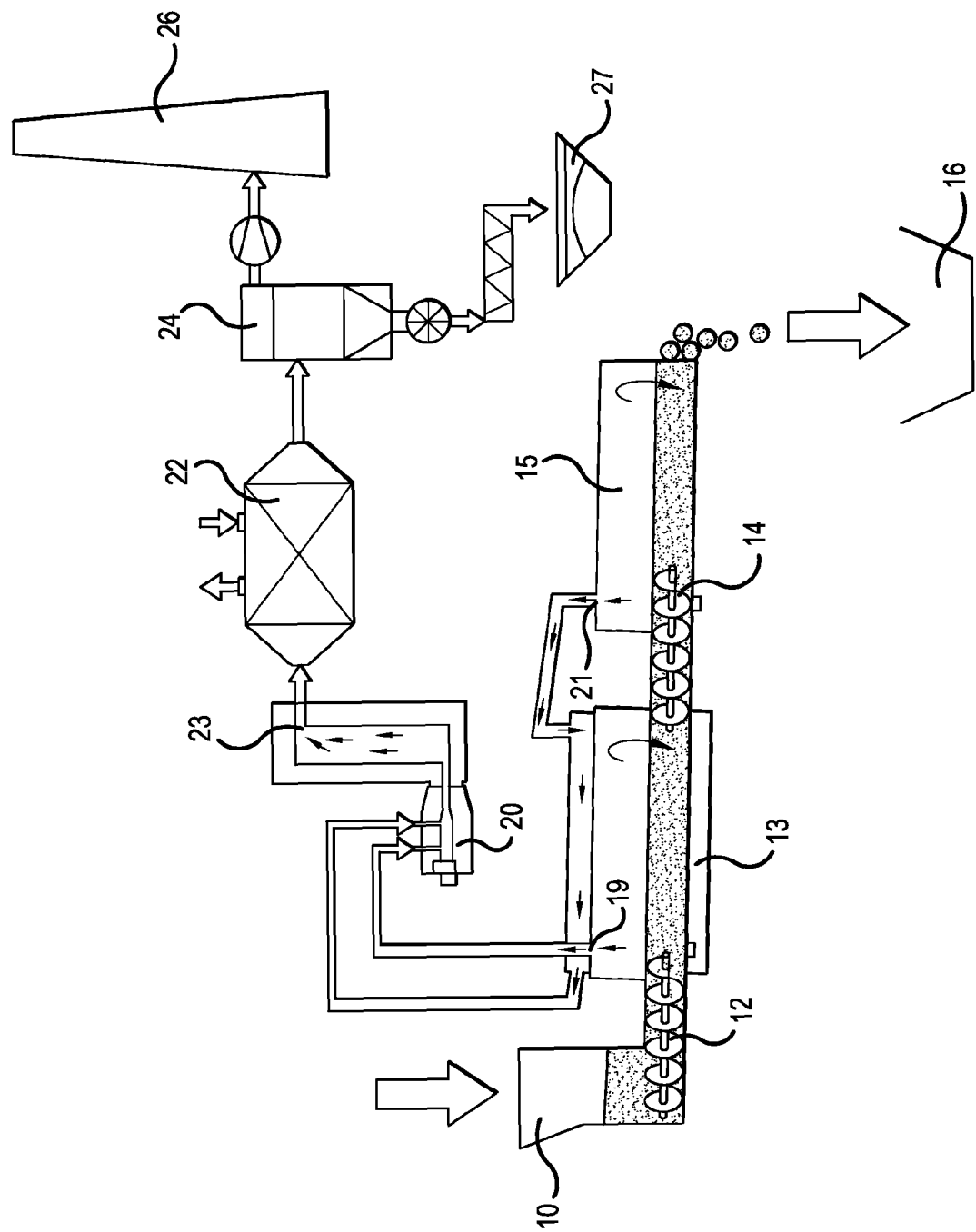

METHOD FOR PRODUCING PHOSPHATES AND PHOSPHATE-CONTAINING COMPOUNDS, PARTICULARLY ALKALINE EARTH PHOSPHATES, ALKALINE EARTH SILICOPHOSPHATES, OR ALKALINE EARTH OXIDES

This nonprovisional application is a continuation of International Application No. PCT/EP2009/008790, which was filed on Dec. 9, 2009, and which is herein incorporated by reference.

BACKGROUND OF THE INVENTION

1. Field of the Invention

The present invention relates to a method for producing phosphates and phosphate-containing compounds, particularly alkaline earth phosphates, alkaline earth silicophosphates, or alkaline earth oxides.

2. Description of the Background Art

Phosphates play an important role in the production of various chemical products, such as, for example, fertilizers, detergent additives, food additives, feedstuffs, and corrosion inhibitors. In chemical terms, phosphates are salts and esters of orthophosphoric acid. Phosphates are extracted from volcanic or sedimentary deposits. Such reserves will be exhausted in the foreseeable future, however, so that a shortage of phosphate and rising prices can be expected. Therefore, efforts have been made increasingly to isolate phosphate from sewage sludge to assure a phosphate supply.

The main reserves of phosphates of natural origin are in northern Africa, Morocco, Western Sahara, the Kola Peninsula, Russia, Florida, South Africa, and China. There are also other reserves in Saudi Arabia; some other mining sites have already been exhausted.

As already mentioned, the aforementioned phosphate resources will be exhausted in the foreseeable future. There is also a major problem that most of these mineral sources are loaded with cadmium and other heavy metals. Many industrialized countries have already established a limit for the cadmium concentration in fertilizers. There is only one mining region, Kola, where the apatite falls below the permissible limit for cadmium and heavy metals in the European Community. As a result, the prices for phosphates and the products produced therefrom, particularly fertilizers, rise very greatly. The transition must therefore be made increasingly to using phosphates from uncontaminated sources.

The recovery of phosphates from sewage sludge, unfortunately, leads to unsatisfactory quantities and qualities. Furthermore, the time and effort to produce phosphates precipitated from sewage sludge, concentrated physically/biologically, and freed of (heavy) metals is very great and requires considerable energy.

It is known that bones and fish bones have a high mineral content and includes primarily of calcium and phosphate. The burning of bones or fish bones produces a grayish-white, porous bone ash, which has about 80% calcium phosphate, 6.6% calcium carbonate, and about 1.4% magnesium phosphate. These natural phosphate sources for the selective production of phosphate have not received attention thus far.

The production of phosphates from organic material is known. For comparison reference is made to publications DE 103 12 603 B4, DE 102 23 657 B4, DE 101 24 073 B4, DE 101 40 312 A1, DE 100 30 550 A1, or JP 2003-1761189, for example. These publications, however, either do not deal with the production of phosphates or describe one-step methods, which cannot be compared with the novel two-step method according to the present invention.

SUMMARY OF THE INVENTION

The object of the present invention is to provide a method for producing phosphates and/or phosphate-containing compounds, said method with which the phosphates and/or phosphate-containing compounds produced therewith can be produced fast, cost-effectively, and efficiently in high yield and purity.

It is possible with the two-step method of the invention to avoid the currently existing disadvantages in the production of phosphates from natural deposits and other sources. In particular, phosphates are obtained in high yield and in nearly chemically pure form. The phosphates produced by the method of the invention are nearly free of cadmium and heavy metals; these occur only in harmless amounts in the end product far below any limit. Cadmium contamination and heavy metal pollution, as these are present in the naturally occurring phosphate resources, are avoided by the method of the invention. A cost-effective and fast method for producing phosphate or phosphate-containing compounds is provided by the invention.

Furthermore, chemically pure phosphoric acid can be produced with the described method.

The method of the invention for producing phosphates and/or phosphate-containing compounds, particularly alkaline earth phosphates, alkaline earth silicophosphates, and alkaline earth oxides comprises the steps:

a. Heating of bones and/or fish bones or a combination of these components in a pyrolysis process in the absence of oxygen and under reducing conditions at temperatures between 500 to 1100° C., whereby high-energy gases, vapors, and carbon are formed, among others, b. Secondary combustion of the carbon formed in step (a) under oxidizing conditions in an oxidation step, whereby an inorganic residue of alkaline earth carbonates, alkaline earth oxides, and alkaline earth phosphates forms.

The recovered highly pure alkaline earth phosphates are suitable as fertilizers or for further processing to phosphoric acid.

In the first step (a), the bones and fish bones are broken down into their organic and inorganic components under reducing conditions at temperatures of about 500 to about 1100° C. The bones or fish bones are preferably coarsely ground beforehand. In so doing, the organic molecule chains are broken up and substantially high-energy gases such as hydrogen, carbon monoxide, and methane form. The energy bound in these gases can be used, for example, to produce electric current.

The inventors have determined that the inorganic residue from step (a) includes primarily of calcium carbonate and magnesium carbonate and/or calcium oxide and magnesium oxide, as well as various calcium phosphates, apart from a considerable surplus of between 5 to 20% pure carbon. This carbon is subsequently combusted oxidatively in a second step (b), whereby again considerable amounts of energy are released. Finally, an inorganic residue of alkaline earth carbonates, alkaline earth oxides, and alkaline earth phosphates remains, which is almost totally free of organic substances and especially free of harmful microorganisms, such as, for example, prions.

The first step (a) is preferably carried out at a temperature of 700 to 900° C. The yield of phosphate or phosphate-containing compounds is highest at these temperatures.

It has proven advantageous, further, if the reaction mixtures are rotated before the reaction using suitable technical measures (e.g., agitators, rotating device) before completion of step (a) and/or at the beginning of step (b). As a result, higher energies and phosphate yields can be achieved. The process becomes more efficient.

Further, magnesium compounds or potassium compounds can be added to the process. The selective addition of crude magnesite ($MgCO_3$) leads to a controlled concentration of the mineral solid Mg or MgO. Preferably, an amount of 10 to 40%, preferably 25% $MgCO_3$ is added, which results in an MgO content of about 10% MgO. This is of increasing importance for agricultural use in terms of plant and animal nutrition. In another embodiment, organic mineral potassium compounds can be added to the bones and/or fish bones or combinations thereof. These originate, for example, from the esterification or transesterification of vegetable or animal fats and oils. In this regard, potassium compounds with significant amounts of various fatty acids form as a byproduct. This leads to further improvement of the energy balance of the method of the invention. Potassium is present at the end of the process in the form of inorganic potassium compounds, as are bound, for example, in carbonates and/or sulfates and/or phosphates. As a result, for example, a phosphate-potassium-lime-magnesium fertilizer suitable for crop production can be produced. Preferably, the organic mineral potassium compounds are added before the reductive phase.

In an embodiment, silicon compounds, for example, in the form of water glass, kieselguhr, and/or perlite, are added to the bones and/or fish bones or combinations thereof. At the process temperatures, a breakdown of said silicon compounds and finally bonding with the alkaline earth metals and the phosphates to form alkaline earth silicophosphates occur. These compounds are especially suitable for use as fertilizers for the improvement of mineral-poor soils.

With the addition of silicon compounds, as they are known, for example, from kieselguhrs, the formation of so-called alkaline earth silicon phosphate complexes occurs during the oxidative secondary combustion. The phosphate solubilities arising thereby correspond in their composition and total availability to known calcined phosphates, such as, for example, Rhenania phosphate. The basically active calcium and/or magnesium compounds are present, depending on the selected temperature, as carbonates (at a temperature <900° C.) or oxides (at a temperature >900° C.).

The energy recovered in steps (a) and/or (b) can be returned to the process. Preferably, the gases or vapors formed by heating the organic bone components are combusted. The gases and vapors can be used to heat the employed bones, fish bones, and additives if applicable.

The phosphates or phosphate-containing compounds produced by the method are primarily dicalcium and tricalcium phosphates.

The chemical purity of the phosphate compounds and the phosphate silicon and magnesium compounds obtained from animal bones and fish bones is clearly superior with respect to the heavy metal amounts to all naturally occurring phosphates of the aforementioned deposits. This relates in particular to the amount of the element cadmium in comparison with the high cadmium concentrations, in part exceeding the limit, in sedimentary phosphates.

The method of the invention is also suitable for eliminating heavy metals. Heavy metals are, for example, lead, cadmium, chromium, copper, nickel, zinc, and mercury. Considerable amounts of the heavy metals already enter the gas phase during the pyrolysis in the first step under reducing conditions and in the absence of oxygen and are eliminated. Further reduction of the heavy metals occurs in the subsequent oxidation step. The result is a highly pure product with a low heavy metal content.

The method can be operated completely self-sustaining due to the return of the energy recovered in steps (a) and (b). The input of external energy is necessary only during the startup phase. Both process steps (a) and (b) can also occur in the same reaction vessels or one after another in different vessels (batch method).

The method of the invention for obtaining high-quality phosphates apart from the energy recovery from animal bones and fish bones can contribute globally to an easing of the competition for raw material reserves, particularly in the production of phosphates. For example, 150,000 t/a [tonnes/annum] of phosphate ($P_2O_5$) can be obtained from 1,000,000 t/a of bones and fish bones, which could be made available from slaughterhouse waste. This can solve many of the future or existing problems with respect to phosphate reserves. The positive energy balance of the method, moreover, contributes to an economic and ecological process design for the method of the invention.

Phosphate recovery from sewage sludge is very costly and complex and does not offer a satisfactory solution. With the method of the invention, it is possible to provide for the recovery of phosphate or phosphate-containing compounds in a simple and rapid manner. The individual products arising from the method can be processed further in different ways depending on the field of application. For example, treatment of the recovered alkaline earth phosphates with food grade sulfuric acid leads to a nearly chemically pure phosphoric acid. The yields and purity grades attained with the method of the invention cannot be achieved with the worldwide phosphate reserves.

The invention can be used in the production of fertilizers, cosmetic products, detergent products, pharmaceutical products, food products, feedstuff products, and other phosphate-containing chemical products.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the different plant sections for the production of phosphate or phosphate-containing compounds are shown in the FIGURE.

DETAILED DESCRIPTION

Bones and/or fish bones are first placed in a box feeder 10 and rotated with a rotating tube 12 before the first process step (a). A thermal heating of the bones or fish bones occurs at high temperatures (preferably between 500 and 1100° C.) under reductive conditions in a pyrolysis apparatus 13. After this first process step, the reaction mixture is again rotated with a second rotating tube 14 and taken to another apparatus for the oxidative secondary combustion 15. As mentioned above, the second process section (b) can also be implemented in the same vessel.

The oxidative secondary combustion occurs at temperatures between 500 and 1200° C. The high-energy gases and vapors, forming in the first and second steps, are collected via outlets 19, 21 from apparatus 13, 14 for energy processing. Furthermore, the gases formed in the first step can be removed by suction and desulfurized with the aid of sulfur bacteria.

The phosphates or phosphate-containing compounds (alkaline earth phosphates) produced by the second process step can be collected by means of additional equipment 16 or processed further depending on the field of application.

A secondary combustion chamber 20, in which gases 23 are finally taken to a steam generator 22, is provided for energy recovery. Shown further are preferred additional sections, particularly a filter 24 and a chimney 26. The dust arising during the filtration can be collected in a dust collector 27.

EXAMPLE 1

Bones from slaughterhouse waste were treated at different temperatures (test variants V1, V2, V3) under reductive conditions in a first step (a). Samples from the same test variant were then combusted oxidatively in a second step (b) (test variants V1.1, V2.2, V3.1). For each test variant, the phosphate solubility was determined after the reductive treatment and oxidative secondary combustion.

It becomes evident thereby that the amount of mineral acid-soluble phosphate can be increased by the downstream connection of the oxidative secondary combustion step (step (b)).

The phosphate solubilities after reductive treatment of meat bones at different temperatures and oxidative secondary combustion are shown in Table 1. The test variants are shown according to the reductive and oxidative treatments.

TABLE 1

| Test variant | reductive | | | |
|---|---|---|---|---|
| | V1 | V2 | V3 | V4 |
| Temperature | 500° C. | 700° C. | 900° C. | 1100° C. |
| Phosphate as $P_2O_5$ in | % | % | % | % |
| Mineral acid-soluble phosphate | 30.0 | 33.6 | 34.4 | 33.7 |
| Phosphate soluble in 2% formic acid | 28.7 | 30.0 | 30.0 | 29.0 |
| Phosphate soluble in 2% citric acid | 24.9 | 23.7 | 23.3 | 21.6 |
| Alkaline ammonium citrate-soluble phosphate | 3.1 | 2.7 | 2.7 | 2.0 |

| Test variant | oxidative | | |
|---|---|---|---|
| | V1.1 | V2.1 | V3.1 |
| Temperature | 850° C. | 850° C. | 850° C. |
| Phosphate as $P_2O_5$ in | % | % | % |
| Mineral acid-soluble phosphate | 39.5 | 40.2 | 40.4 |
| Phosphate soluble in 2% formic acid | 21.8 | 17.7 | 19.5 |
| Phosphate soluble in 2% citric acid | 16.9 | 13.9 | 14.8 |
| Alkaline ammonium citrate-soluble phosphate | 2.9 | 2.3 | 2.0 |

The phosphate contents in the residues in the reductive phase are between 31.0 (V1) and 34.4% $P_2O_5$ (V3). The optimal $P_2O_5$ yield for process step (a) therefore occurs at temperatures between 700° C. (V2) and 900° C. (V3). Higher temperatures do not reveal a significant gain in $P_2O_5$. Dicalcium phosphates (alkaline ammonium citrate-soluble phosphate), tricalcium phosphates (phosphate soluble in 2% formic acid/citric acid), and mineral acid-soluble phosphates, which are valuable for plant nutrition and further information, are present in significant amounts.

It could be demonstrated further that the total residual carbon is converted to thermal energy in the oxidative phase. The $P_2O_5$ binding form under oxidative conditions undergoes a shift to tricalcium phosphates.

In the oxidative treatment phase of step (b), the total $P_2O_5$ concentration increases by values between 19.6 and 27.4%. The test variants V2.1 and V3.1, moreover, have $P_2O_5$ concentrations of more than 40%. These high values occur in nature only in the volcanic apatites (e.g., Kola apatite).

EXAMPLE 2

The total carbon content (TC) after reductive treatment of meat bones at different temperatures or oxidative secondary combustion and the development of the contents of inorganic substances were determined based on the procedure described in Example 1. The individual test variants are listed in Table 2 according to the reductive and oxidative treatment.

TABLE 2

| Test variant | Reductive | | | |
|---|---|---|---|---|
| | V1 | V2 | V3 | V4 |
| Temperature | 500° C. | 700° C. | 900° C. | 1100° C. |
| Total carbon and organic substances in | % | % | % | % |
| Total carbon (TC) | 15.1 | 13.3 | 11.3 | 10.9 |
| Organic substance | 20.7 | 16.7 | 13.6 | 15.9 |

TABLE 2-continued

|  | oxidative | | |
| --- | --- | --- | --- |
| Test variant | V1.1 | V2.1 | V3.1 |
| Temperature | 850° C. | 850° C. | 850° C. |
| Total carbon and organic substances in | % | % | % |
| Total carbon (TC) | 0.6 | 1.2 | 1.5 |
| Organic substance | 0.5 | 0.8 | 0.8 |

It is clearly evident that after the oxidative secondary combustion the total carbon (TC) and the organic substance were converted almost totally into thermal energy. After the first process step (a), the residual carbon contents in the first phase varied between 10.9% at a temperature of 1100° C. and 15.1% at a temperature of 500° C. The same trend is also evident in the content of organic substances.

EXAMPLE 3

An advantage of the phosphate or the phosphate-containing compounds produced according to the invention is that the thus obtained phosphate compounds have only very low amounts of heavy metals. Naturally occurring phosphate sources are clearly contaminated with heavy metals, particularly with cadmium.

The heavy metal contents in solid material after reductive treatment of meat bones at different temperatures and oxidative secondary combustions in comparison with crude phosphates, as they are available in the resources obtainable so far, are contrasted in Table 3. Further, the allowable limits according to the German Fertilizer Regulations (Dün VO/03) are shown.

TABLE 3

|  |  | reductive | | | |
| --- | --- | --- | --- | --- | --- |
| Test variant |  | V1 | V2 | V3 | V4 |
| Temperature |  | 500° C. | 700° C. | 900° C. | 1100° C. |
| Heavy metal contents in |  | ppm | ppm | ppm | ppm |
| Arsenic | As | <2.00 | <2.00 | <2.00 | <2.00 |
| Lead | Pb | 2.77 | 1.96 | 1.90 | 2.50 |
| Cadmium | Cd | <0.50 | <0.50 | <0.50 | <0.50 |
| Mercury | Hg | <0.05 | <0.05 | <0.05 | <0.05 |
| Thallium | Tl | 0.745 | 0.50 | 0.50 | <0.50 |

|  |  | oxidative | | |
| --- | --- | --- | --- | --- |
| Test variant |  | V1.1 | V2.1 | V3.1 |
| Temperature |  | 850° C. | 850° C. | 850° C. |
| Heavy metal contents in |  | ppm | ppm | ppm |
| Arsenic | As | 2.61 | <2.00 | <2.00 |
| Lead | Pb | 2.98 | <1.00 | <1.00 |
| Cadmium | Cd | <0.50 | <0.50 | <0.50 |
| Mercury | Hg | <0.05 | <0.05 | <0.05 |
| Thallium | Tl | <0.50 | <0.50 | <0.50 |

TABLE 3-continued

| Test variant |  | Morocco | Algeria | Israel | Limits |
| --- | --- | --- | --- | --- | --- |
| Temperature |  | crude | crude | crude | Dün VO/03 |
| Heavy metal contents in |  | ppm | ppm | ppm | ppm |
| Arsenic | As | 13.3 | 4.05 | N/A | 40 |
| Lead | Pb | 3.54 | 3.62 | N/A | 150 |
| Cadmium | Cd | 22.0 | 19.0 | 4.0 | 1.5 |
| Mercury | Hg | <0.05 | <0.05 | N/A | 1 |
| Thallium | Tl | <0.05 | 2.12 | N/A | 1 | i. Typical Values

It is clearly evident that even after the first process step of the method of the invention nearly no cadmium can be detected in the individual test variants. The heavy metal contents of phosphates from Morocco, Algeria, and Israel are clearly above the values for the products produced according to the invention. In part, they are also clearly above allowable limits, so that phosphates from these regions cannot be used without additional treatment, for example, for use as fertilizer. The phosphate produced according to the invention is highly chemically pure.

EXAMPLE 4

The following Table 4 illustrates the urgency for an alternative process according to the invention. Many of the reserves of the phosphate resources will no longer be available in the short or medium term.

TABLE 4

|  |  | Morocco | Tunisia | Jordan | Israel | South Africa | Russia | USA | China |
| --- | --- | --- | --- | --- | --- | --- | --- | --- | --- |
| Reserves | % | 34 | N/A | 5 | N/A | 9 | N/A | 6 | 39 |
| Production | % | 17 | 5 | N/A | N/A | N/A | 7 | 26 | 21 |

Many of the phosphate reserves have already been exhausted or will be exhausted within the next few years or decades. It is to be expected that the prices will increase drastically without the provision of an alternative process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing phosphates and/or phosphate-containing compounds, the method consisting of:
   (a) placing bones in a reaction vessel and heating of the bones in the absence of oxygen at temperatures between 500° to 1100° C. to form gases and carbon; and
   (b) successive combustion of the carbon formed in step (a) under oxidizing conditions at temperatures between 500° to 1200° C.,
   wherein the bones are rotated via a rotating tube before at least one of step (a) or step (b), and
   wherein the carbon formed in step (a) is solid carbon.

2. The method according to claim 1, wherein step (a) is carried out at a temperature between 700° to 900° C.

3. The method according to claim 1, wherein step (a) and step (b) are carried out in the same reaction vessel.

4. The method according to claim 1, wherein at least some of the bones are fish bones.

* * * * *